May 6, 1952   J. G. DAVIAU   2,595,230
FISHING ROD CASE
Filed Oct. 1, 1947

Inventor

Jerome G. Daviau

By *Clarence A. O'Brien and Harvey B. Jacobson*
Attorneys

Patented May 6, 1952

2,595,230

UNITED STATES PATENT OFFICE 2,595,230

FISHING ROD CASE

Jerome G. Daviau, Waterville, Maine

Application October 1, 1947, Serial No. 777,142

1 Claim. (Cl. 43—26)

This invention relates to new and useful improvements and structural refinements in fishing rod cases, and the principal object of the invention is to provide a device of the character herein described, such as may be conveniently and effectively employed for carrying and storing fishing rods in a manner which will prevent them from sinking into the water if they should accidentally or unintentionally fall off the dock or over the side of a boat.

A further object of the invention is to provide a fishing rod case which permits the rods carried or stored therein to become dry after use, which advantage is of particular importance, since fishing rods are frequently forgotten in the conventional, more or less air-tight cases, so that proper drying thereof is not facilitated and warping or twisting of the rods usually results.

Another object of the invention is to provide a fishing rod case which includes means for retaining the fishing rod in a straight position while drying, and a further precaution against the possibility of the rod becoming twisted or warped.

An additional object of the invention is to provide a fishing rod case which is simple in construction and wherein the rods may be easily applied or removed.

A still further object of the invention is to provide a fishing rod case which will not easily become damaged, which will readily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawing in which.

Like characters of reference are employed to designate like parts throughout the specification and throughout the several views.

Figure 4:
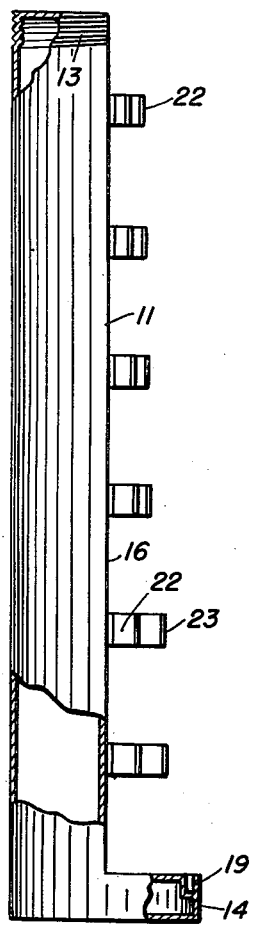
Figure 4 is a side elevational view of a carrier used in the invention, the same being partially broken away to reveal its construction.

Referring now to the accompanying drawing in detail, the invention consists of a fishing rod case designated generally by the reference character 10, the same embodying in its construction two primary elements or units, a carrier 11 and a cover 12.

The carrier 11 assumes the form of a substantially semi-cylindrical, hermetically sealed and buoyant unit, one end portion of which is screw threaded as at 13, while its remaining end portion is of a circular, disc-shaped configuration, as at 14.

Needless to say, the carrier 11 as well as the cover 12 may be constructed of any suitable material, such as plastic, aluminum, or the like, but the essence of novelty in the invention resides in the formation or construction of the carrier 11 in such manner that it is of a buoyant character, that is, that it will float, together with the cover 12, when dropped in water.

Figure 3:
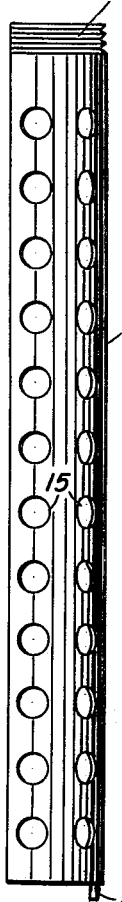
Figure 3 is a side elevational view of the cover per se.
Figure 2:
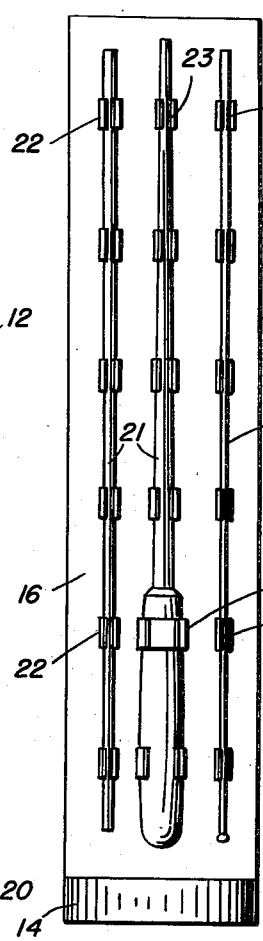
Figure 2 is an elevational view, similar to that shown in Figure 1, but showing the cover removed.
Figure 1:
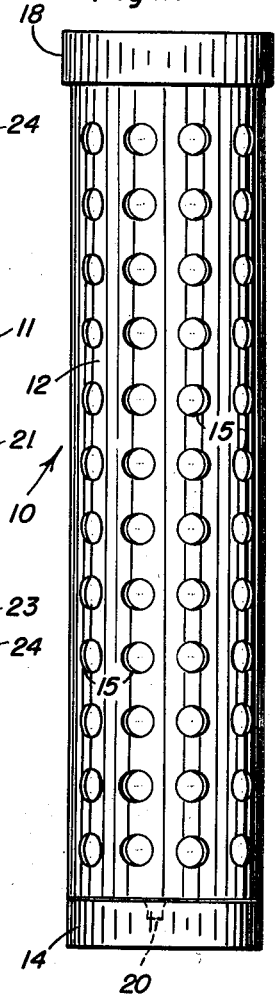
Figure 1 is an elevational view of the invention with the cover thereof in position.
Figure 5:
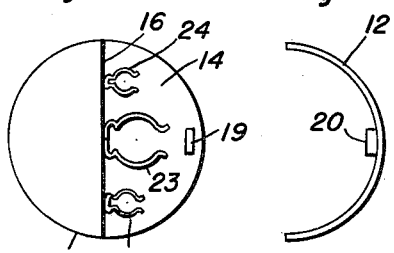
Figure 5 is a top plan view of the carrier shown in Figure 4.
Figure 6:
Figure 6 is a top plan view of the cover shown in Figure 3.

The cover 12 is elongated and has an arcuate cross sectional configuration as is best shown in Figures 3 and 6, being somewhat shorter with respect to the overall length of the carrier 11. The cover 12 is formed with a plurality of ventilating openings or apertures 15, and is adapted for positioning adjacent a substantially flat wall 16 of the carrier in such manner that when the cover is so positioned it coacts with the carrier in defining a substantially cylindrical body.

Means are provided for removably retaining the cover in this position, that is, for removably attaching the cover 12 to the carrier 11, said means consisting of a screw threaded portion 17 at one end of the cover, which is complementary to the screw threaded portion 13 at one end of the carrier 11. When the cover is disposed on or associated with the carrier, the threaded portions 13, 17 are adapted to receive a removable, internally screw threaded cap 18, while the remaining end of the cover 12 rests upon or abuts against the portion 14 of the carrier, as will be clearly understood.

As is best shown in Figure 4, the portion 14 of the carrier 11 is provided with a depression or recess 19 which is adapted to removably receive a projecting tongue 20 provided on the cover 12, which recess and tongue coact with the aforementioned cap 18 in securely yet separably attaching the cover to the carrier.

As will be clearly understood, the cover 12 coacts with the carrier 11 to form what may be referred to as a receptacle for the fishing rods, the latter being designated by the reference character 21. Means are provided for removably retaining these rods in the receptacle, said means consisting of a plurality of sets of longitudinally aligned, resilient clips 22, 23 and 24, which are secured to the wall 16 of the carrier 11 in any suitable manner.

When the invention is placed in use, the fishing rods 21 are simply applied to the clips 22, etc., whereupon the cover 12 is placed in position adjacent the carrier 11 and is secured thereto by means of the tongue 20 engaging the recess 19 and by means of the removable cap 18.

In the event that the entire case should be unintentionally or accidentally dropped into the water, flotation thereof will be sustained by means of the buoyant carrier and undue loss of the fishing rods (as well as of the case) will be prevented.

Moreover, when, after normal use, the rods are placed in the case, proper drying thereof will be facilitated by virtue of the ventilating openings 15 with which the cover 12 is provided. Also, the clips 22, 23 and 24 will retain the rods in a straight position, thereby preventing twisting or warping, as will be clearly apparent.

Needless to say, the rods may be quickly and easily removed from the case by simply unscrewing the cap 18 from the members 11 and 12, and disengaging the tongue 20 from the recess 19, whereby immediate separation of the cover 12 from the carrier 11 will be facilitated.

If so desired, the wall 16 of the carrier 11 may have an arcuate cross sectional configuration, so as to afford a more compact storage of the fishing rods.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to such as may lie within the spirit and scope of the invention as claimed.

Having described the invention, what is claimed as new is:

A fishing rod case comprising in combination a hollow semi-cylindrical buoyant carrier including a flat side wall and a semi-circular extension projecting laterally at the lower end of said side wall whereby the lower end of the carrier is substantially circular in configuration, a plurality of resilient fishing rod retaining clips provided at vertically spaced points on the outer surface of said side wall, a substantially semi-tubular cover removably positioned adjacent the flat side wall of said carrier and complementing the same to afford a substantially cylindrical body, said cover extending from the upper end of the carrier to the upper surface of said lateral extension and being provided with a plurality of vent openings, a detent provided at the lower end of said cover and engaging a recess in the upper end of said extension, and an internally screw-threaded flanged cap removably positioned at the upper end of the carrier and cover for sustaining the same together.

JEROME G. DAVIAU.

REFERENCES CITED

The following references are of record in the file of this patent:

UNITED STATES PATENTS

| Number | Name | Date |
| --- | --- | --- |
| 442,269 | Kopf | Dec. 9, 1890 |
| 685,091 | Becton | Oct. 22, 1901 |
| 754,971 | Cloherty | Mar. 22, 1904 |
| 1,370,432 | Gvosdenovich | Mar. 1, 1921 |
| 1,627,416 | Schuman | May 3, 1927 |

FOREIGN PATENTS

| Number | Country | Date |
| --- | --- | --- |
| 727,422 | France | of 1932 |